US012363479B2

(12) United States Patent
Coombs

(10) Patent No.: US 12,363,479 B2
(45) Date of Patent: Jul. 15, 2025

(54) SOUND BAR ASSEMBLY WITH ADJUSTABLE ENDCAPS

(71) Applicant: Origin Acoustics, LLC, Las Vegas, NV (US)

(72) Inventor: Jeffery James Coombs, Lake Havasu City, AZ (US)

( * ) Notice: Subject to any disclaimer, the term of this patent is extended or adjusted under 35 U.S.C. 154(b) by 382 days.

(21) Appl. No.: 17/990,613

(22) Filed: Nov. 18, 2022

(65) Prior Publication Data

US 2023/0164487 A1 May 25, 2023

Related U.S. Application Data

(60) Provisional application No. 63/281,613, filed on Nov. 19, 2021.

(51) Int. Cl.
*H04R 5/02* (2006.01)

(52) U.S. Cl.
CPC .................................... *H04R 5/02* (2013.01)

(58) Field of Classification Search
CPC .... H04R 5/02; H04R 1/026; H04R 2201/029; H04R 2499/15; H04R 2201/025; H04R 2205/022; H04R 1/02; H04R 2201/028; H04R 2201/403; H04R 1/403; H04R 1/345; H04R 3/12; H04R 1/025; H04R 1/028; H04R 2205/024; H04R 2201/021; H04R 2205/021; H04R 1/26; H04R 1/00
See application file for complete search history.

(56) References Cited

U.S. PATENT DOCUMENTS

| | | | | |
|---|---|---|---|---|
| 2010/0008522 A1* | 1/2010 | Sumitani | H04R 1/26 381/182 |
| 2012/0308065 A1* | 12/2012 | Padalino | H04R 5/02 381/335 |
| 2013/0070944 A1* | 3/2013 | Lee | H04R 5/02 381/306 |
| 2013/0301861 A1* | 11/2013 | Ho | H04R 1/023 381/332 |
| 2013/0329936 A1* | 12/2013 | Tseng | H04R 1/025 381/387 |
| 2017/0295426 A1* | 10/2017 | Park | H04R 1/403 |
| 2020/0280776 A1* | 9/2020 | Okano | H04R 1/023 |
| 2024/0098395 A1* | 3/2024 | Berry | H04R 1/025 |

FOREIGN PATENT DOCUMENTS

| | | | |
|---|---|---|---|
| CN | 201131041 Y * | 10/2008 | |
| JP | 2009044343 A * | 2/2009 | H04R 1/00 |
| KR | 20090099669 A * | 9/2009 | H04R 1/26 |

* cited by examiner

*Primary Examiner* — Angelica M McKinney
(74) *Attorney, Agent, or Firm* — PAUL B. HEYNSSENS ATTORNEY AT LAW, PLC

(57) ABSTRACT

The present example provides an adjustable sound bar that includes endcaps under spring bias that may be adjusted in or out-allowing the sound bar width to better match the width of an adjacent component, such as television by extending or retracting endcaps of the sound bar.

19 Claims, 6 Drawing Sheets

Adjustable Sound Bar
203

Method of adjusting an end cap on the adjustable sound bar
601

Sound Bar with Adjustable End Caps
203

Method of adjusting a sound bar width
501

Method of adjusting an end cap on the adjustable sound bar
601

SOUND BAR ASSEMBLY WITH ADJUSTABLE ENDCAPS

CROSS-REFERENCE TO RELATED APPLICATION

This application claims the benefit of U.S. Provisional Patent Application No. 63/281,613 filed Nov. 19, 2021, the contents of which are hereby incorporated by reference.

TECHNICAL FIELD

This description relates generally to home entertainment electronics and more specifically to audio and visual systems.

BACKGROUND

Flat screen television manufacturers tend to concentrate on producing a TV that produces a quality picture with sound quality not being as important. In addition, there tends to be competition in producing a flat screen television ("TV" or "television") that has a sleek or slim outline, and tends to be thin in cross section. Circuitry for reproducing improved sound to accompany a television picture on the other hand tends to increase the size of the television enclosure, if the sound circuitry is disposed in the television chassis. Accordingly the speakers provided in a flat screen television may not produce as good sound as the old CRT TVs whose larger cabinets allowed for better speakers and speaker enclosures. Accordingly to get pleasing sound to go with a beautiful picture produced on their flat screen TV, consumers may customize a sound signal from the flat screen TV with various auxiliary components.

A TV may typically be coupled to an auxiliary sound system such as a stereo or multichannel system typically including an amplifier or receiver and high quality speakers. A more typical and more cost effective solution may be to add a sound bar (either with or without a remote subwoofer). Coupling such an auxiliary sound system to the television tends to fill the room with improved sound or otherwise enhance audio emanating from a television's speakers in volume and quality. Accordingly many television manufacturers often produce televisions with minimal audio circuitry in anticipation of the consumers using add on audio components for improved sound.

The sound bar (or equivalently "soundbar" or "media bar") configuration is typically in the form of an oblong box mounted adjacent to the television. Even though they tend to not produce as good a sound as a home sound system (stereo or multichannel), a sound bar still provides improvement over the sound of the TV alone. The sound bar may include right and left speakers, a center channel speaker, or the like. All of which tend to produce an improvement in volume as well enhancing directional effects.

Conventional sound bars are often purchased as an add-on component suitable for use with a wide variety of televisions. However, televisions tend to come in a variety of widths.-Even for televisions with the same nominal scree size the overall width of the television may vary as flat screen TVs may have bezels of varying widths. Typical sound bars may be provided in one or more fixed widths, some of which may be produced in various widths to nominally match the width of a particular television. However, the sizing may be off due to variations in the various actual TV widths. Since sound bars are typically mounted adjacent to a television set, if the widths of the components do not match a non-uniform appearance is presented. Accordingly it would be desirable to provide a sound bar that has an adjustable width so that its width may be made to better match the differing widths of various TVs, providing a more streamlined overall appearance.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an adjustable length sound bar ("adjustable sound bar") that includes endcaps (or equivalently "end caps") under spring bias that may be adjusted in or out-allowing the sound bar width to better match the width of an adjacent component, such as television by extending or retracting endcaps of the sound bar.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an adjustable sound bar system. Although the present examples are described and illustrated as being implemented as a horizontal rectangular adjustable sound bar system, the system described is provided as an example and not a limitation. As those skilled in the art will appreciate, the present examples are suitable for application in a variety of different types of mountings such as vertical, or the like. And a variety of differing shaped adjustable sound bars (such as oval square, round, and the like) may be produced.

Figure 1:
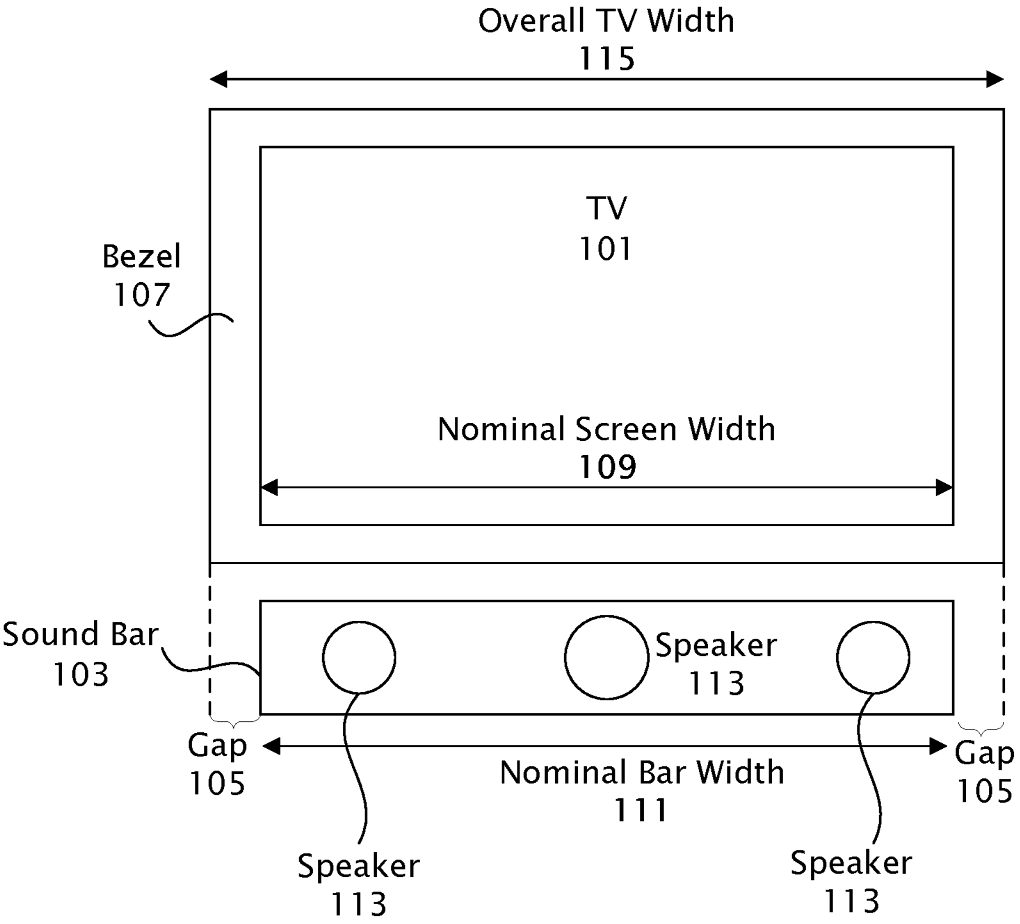
PRIOR ART FIG. 1
FIG. 1 shows a television with a conventional sound bar.

FIG. 1 shows a television 101 with a conventional sound bar 103. In a typical home a TV 101 may have a sound bar 103 of a nominal bar width 111 disposed beneath it. The sound bar 103 typically contains a plurality of speakers 113. The sound bar is coupled to the TV audio outputs (not shown) through a wired, optical or wireless connection (not shown) to enhance the sound produced by the TV through the speakers.

Such sound bars 103 are typically of a fixed width, and there may be gaps 105 between the end of the sound bar and the edge of the TV 101 when the bar is typically centered beneath the TV 101, giving a mismatched overall appearance. This gap may be present even though the nominal screen width of the TV 109 and the sound bar width 111 are stated as being the same. The gap is typically due to variation in the bezels 107 made by the various manufacturers.

It would be desirable to have a sound bar that may be adjusted in length to match the overall TV width 115 that typically varies from manufacturer to manufacturer for sets of the same nominal screen width 109.

Figure 2:
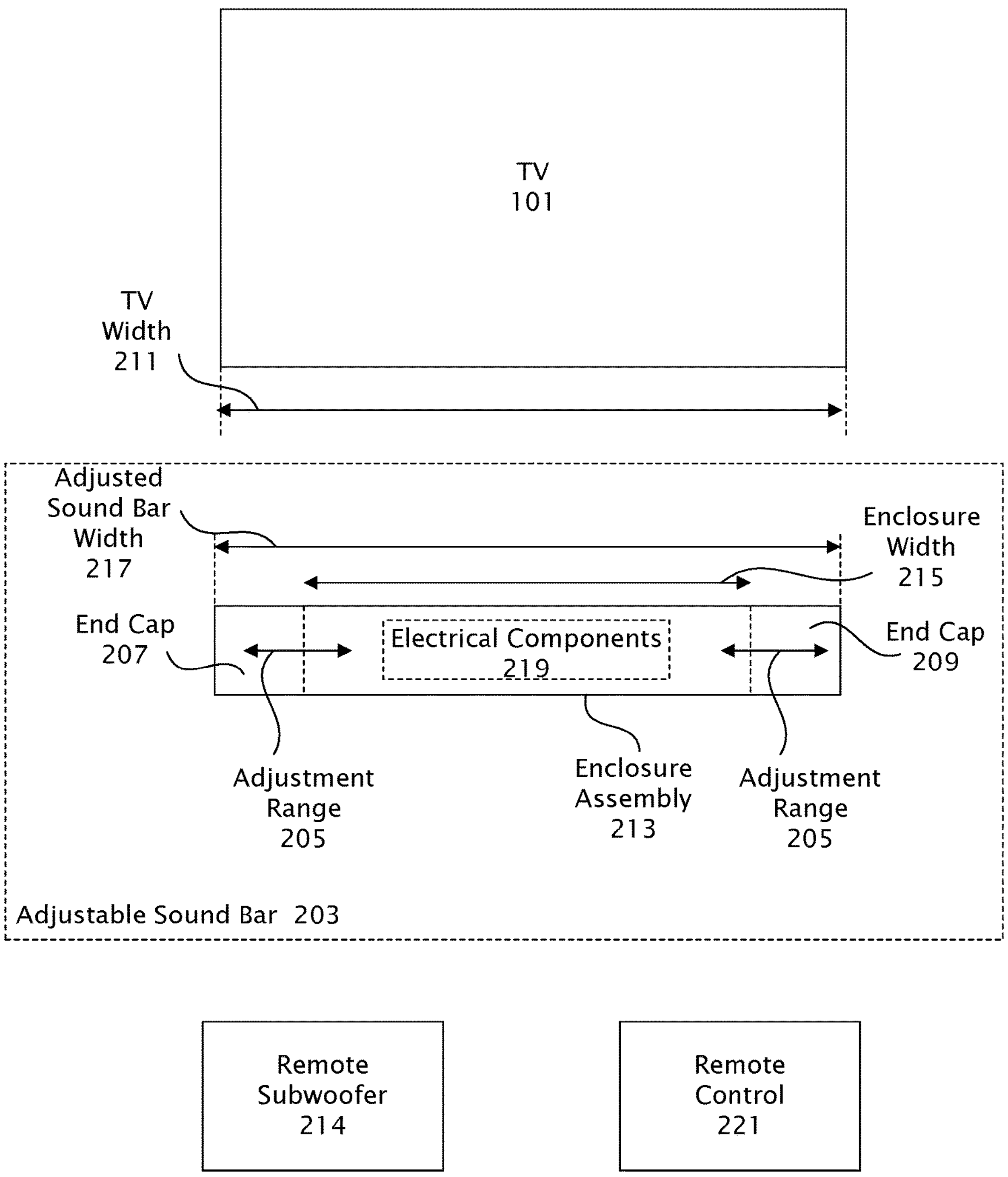
FIG. 2 shows a television system including an adjustable sound bar with adjustable endcaps.

FIG. 2 shows a television system including an adjustable sound bar with adjustable endcaps 203. The length of the enclosure assembly 213 may be selected to be less than the smallest TV in the design range, and the adjustment range provided by the endcaps may be selected so that the endcaps fill the gap left by the widest TV in the design range when the endcaps are extended.

The sound bar with adjustable endcaps may be part of an audio visual system that includes a remote control 221, and a conventionally constructed TV 101, and remote subwoofer 214. The sound bar with adjustable endcaps 203 includes an enclosure assembly 213, and endcaps 207, 209 slidably disposed over the exterior of the enclosure assembly 213.

The enclosure assembly 213 typically includes electrical components 219 and is of a fixed width. Keeping the enclosure assembly of a fixed width allows the electrical components such as external connections, audio processing circuitry, crossover networks speakers and the like to have a common layout that may be used in sound bars for a variety of TV widths.

The enclosure assembly 213 may include electrical components 219. Components may include a panel for external connections, audio processing circuitry, speakers, and the like. In particular tweeters of the ribbon type may be utilized. The enclosure may be covered, or partially covered with speaker grill material, such as cloth or the like (not shown).

The endcaps 207, 209 may each be adjusted over a range of adjustment 205. The final adjusted width 217 of the adjustable sound bar 203 typically matches the width 211 of the TV 101. The endcaps 207, 209 are typically slidably coupled to the enclosure assembly. That is the interior geometry and dimensions of the endcaps may be selected to match the exterior of the enclosure assembly (with dimensional allowance to allow the endcap (or equivalently "end cap") to slide over the enclosure assembly. The endcaps are hollow and of a depth equal to the desired gap plus a further amount (as determined by those skilled in the art) to still guide the endcap over the sound bar when the endcap is extended to its maximum. In alternative examples a sound bar with adjustable endcaps having only one endcap may be produced.

A subwoofer 214 and a remote control 221 may also be included in the system. The adjustable sound bar may be coupled (connections not shown) to the TV 101, and other external components such as a remote subwoofer 214 as is known to those skilled in the art. Alternatively the subwoofer may be connected to the TV 101. Connections may be of any hard wired type known to those skilled in the art such as RCA connectors, optical cables or the like. Alternatively conventional wireless connections, such as Bluetooth or the like may be utilized, in particular to the subwoofer 213, and remote control 221 which are often more distant from the TV, and where wires or cables would be cumbersome.

Figure 3:
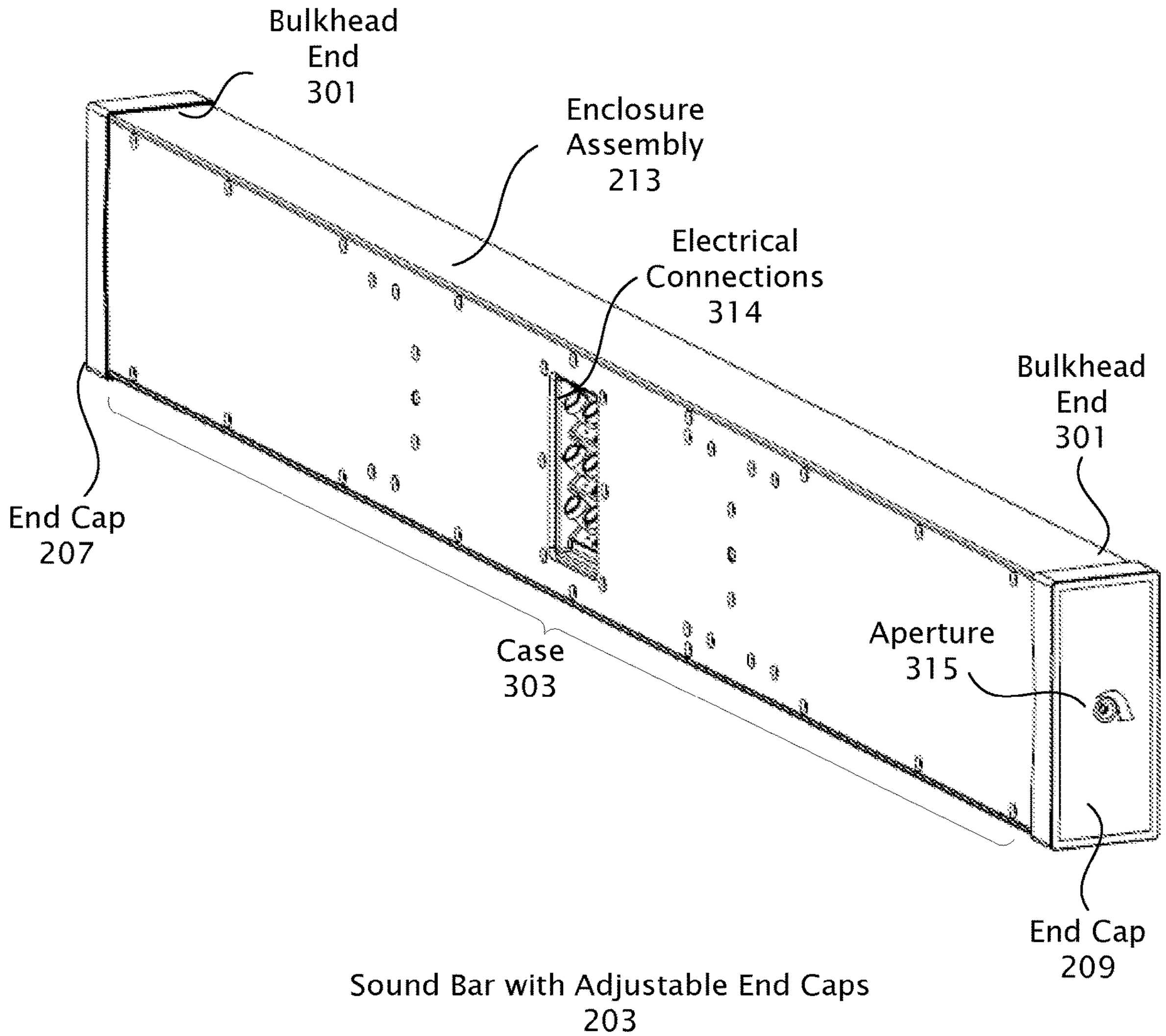
FIG. 3 shows an incline view of adjustable sound bar.

FIG. 3 shows an incline view of adjustable sound bar 203. In particular the view is of the rear of the adjustable sound bar 203. Shown is the case 303 including the enclosure assembly 213, electrical connections 314, and a pair of bulkhead ends 301. Endcaps 207, 209 include apertures 315 and fit over the bulkhead ends 301.

In the present example the overall shape of the sound bar 203 is rectangular with endcaps 207, 209 positioned at opposite ends of the case 303. As can be seen in the figure the endcaps 207, 209 fit over the bulkhead ends 301 and may slide along the exterior of the case 303 when adjusted through apertures 315 in each endcap. The endcaps 207, 209 are typically made from a plastic material, or alternatively from a material matching the case 303.

The enclosure assembly 213 is shown as being assembled from a plurality of panels. However in alternative examples the enclosure assembly may be formed from an extrusion. In alternative examples the case may have any elongate shape, including tubular, oval, irregular, or the like with endcaps of an appropriate shape fitting over the ends and adjusted as described herein. The enclosure assembly 213 may be made from aluminum, plastic or any suitable material.

The case 303 includes bulkhead ends 301 at opposite ends of the case 303 over which the endcaps 207, 207 are slidably disposed. The bulkhead ends 301 and the matching endcaps 207, 209 are shown as being identical. However, depending upon desired design aesthetics the ends may be of differing shapes and or dimensions.

In alternative examples the endcaps may slide along the interior of the body, or over internal guides. In alternative examples the endcaps may also be guided by tracks, or guide rods. In general adjustment of the endcaps may be accomplished through rotation of any suitable routable adjustment device accessed at an aperture 315 in each endcap. In an alternative example the endcaps may be adjusted via a friction fit. In summary any device known to those skilled in the art that allows the endcaps to be extracted or extended to a desired length without falling off or slipping may be employed.

The electrical connections 314 (typically optical, wireless, or the like) are shown positioned as centered in the back of the case 303. However they may be positioned at any convenient location on the back of the case 303, or even on any other available surface, or split into several locations (such as a headphone jack or other auxiliary connection of a front side.

Figure 4:
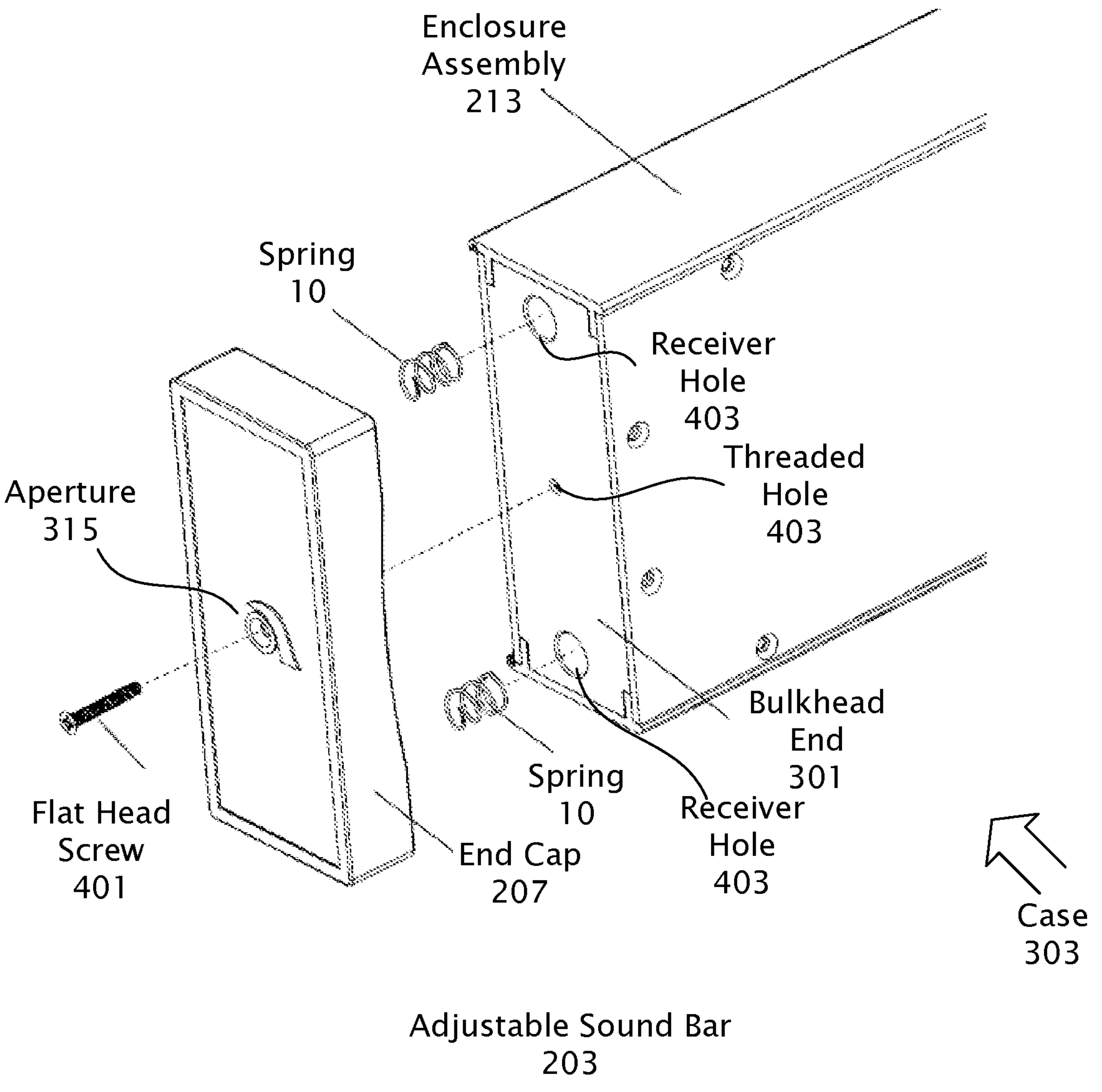
FIG. 4 shows an exploded view of the end of the adjustable sound bar.

FIG. 4 shows an exploded view of an end of the adjustable sound bar 203. The view shows the details of how the adjustable endcap 207 may be installed on the enclosure assembly 213 that contains the sound components (not shown).

In the present example the screw 401 is inserted through an aperture 315 in the endcap. The endcap 207 is typically empty, and shaped to fit over the bulkhead end 301 of the case 303. The aperture 315 is typically positioned at the center of the endcap 207. That is the endcap aperture may be disposed in a surface opposite an open end of the endcap.

The screw may be threadably coupled to the bulkhead end 301 via a threaded hole 403 that is centered in the bulkhead end 301.

The bulkhead end 301 typically presents a flat surface parallel to an interior flat surface located at the interior of the endcap 207. Two receiver holes 403 may be disposed in the bulkhead end 301. The receiver holes 403 are typically positioned with the threaded hole 403 between them. The receiver holes are of a diameter sufficient to allow exemplary coil springs 10 inserted into them to flex freely in the longitudinal direction. The holes 403 are blind holes, as they are not through holes but provide a backstop (either by not being drilled through, or by having a plate installed over the back of a through hole) for the spring 10 at one spring end (the interior surface of the endcap 207 providing a backstop for the opposite other spring end of the spring 10). The perimeter of the bulkhead 301 typically follows the outline of the interior of the endcap in a way that allows the endcap to slide over the exterior of the enclosure assembly 213.

The endcap 207 is typically cup shaped without interior details, and side walls that are of approximately uniform thickness. Endcap 207 is sized to fit over the body of the case 303 at the bulkhead end 301. The side walls are shaped to slide over the exterior surface of the enclosure assembly 213. The aperture in the endcap has a diameter greater than that of the threaded portion of the fastener for clearance, but a diameter less than that of the head of the fastener.

A screw 401, threaded fastener, or other equivalent mechanism may be used to adjust the distance the endcap being pushed away from the case 303. In the example shown an exemplary flat headed M4×40 mm long screw is used. Accordingly each endcap in the present example may be adjusted less than 40 mm. In alternative examples other types of fasteners of differing types threads and lengths, and the like may be used. In an alternative example the springs may be eliminated and a screw with a head that is captive to the cap and free to rotate may be used to extend and retract the endcap.

One or more exemplary coil springs 10 provide mechanical bias to push the endcap 207 outward and away from the bulkhead 301 by pushing against an inner surface of the endcap. The uncompressed length of the spring should be long enough that it does not fall out when the screw 401 is minimally engaged with threaded hole 403. Spring bias pushes the cap out to its extended position as limited by a flat head screw 401 inserted through aperture 315, keeping the cap in place.

The springs 10 shown are coil springs, however other equivalent types devices capable of providing mechanical bias such as leaf springs or the like may also be used. As the screw is drawn towards the bulkhead end 301 the springs 10 tend to compress and keep the cap pushed out against the screw head as the cap moves towards the bulkhead end 301. As the screw is extended away from the bulkhead end 301 the springs 10 extend but still tend to provide bias to keep the cap pushed out against the screw head as the cap moves away from the bulkhead end 301.

By extending or retracting the screw 401 the endcap may be extended or retracted to make the width of the sound bar match the width of the TV. In alternative examples other ways of extending and retracting the endcap as known to those skilled in the art may be employed.

Figure 5:
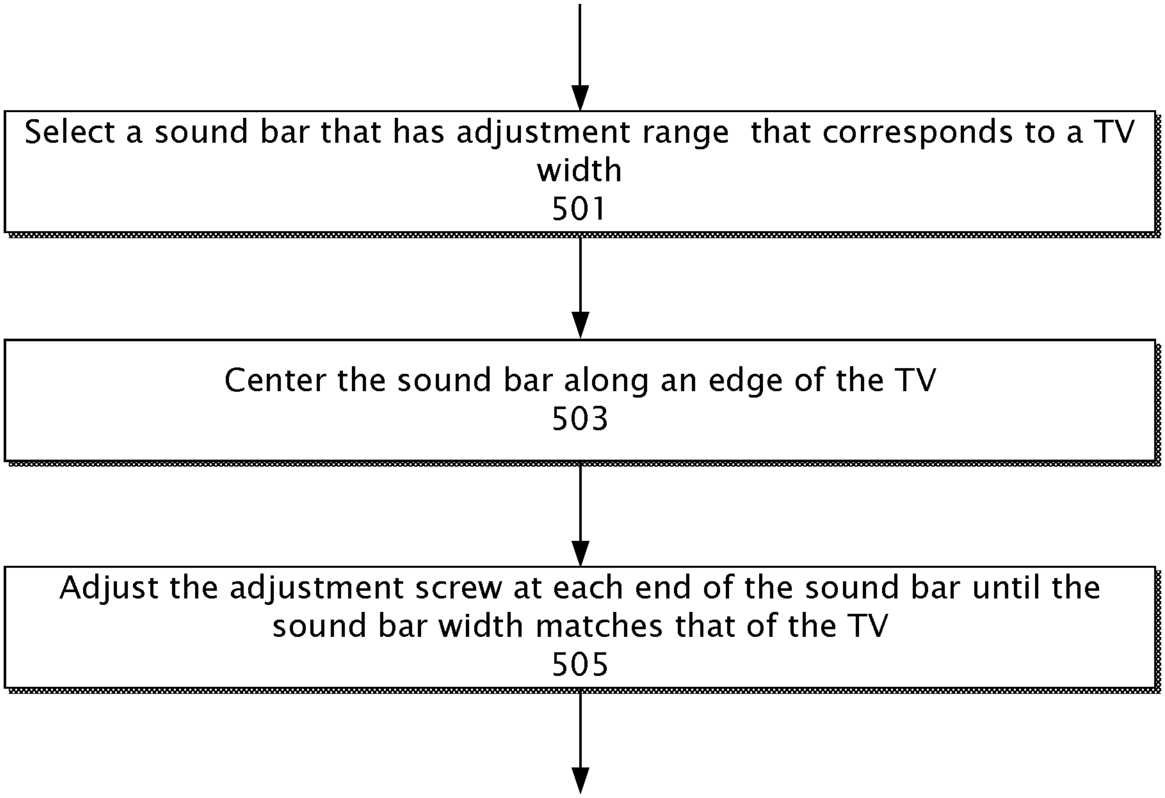
FIG. 5 shows a method of adjusting the adjustable sound bar width.

FIG. 5 shows a method 501 of adjusting the adjustable sound bar (203 of FIG. 2) width. The goal is to adjust the sound bar width to match a TV's width as much as possible. First select a sound bar that has adjustment range that corresponds to a TV width 501. If the endcaps are not preinstalled they may be installed as described in FIG. 6.

To adjust the width of the sound bar to match that of the TV, center the sound bar along an edge of the TV, 503. Adjust the adjustment screw at each end of the sound bar until the sound bar width matches that of the TV 505. Alternatively, only one endcap can be adjusted typically in situations where the sound bar is very close to the width of the television.

Figure 6:
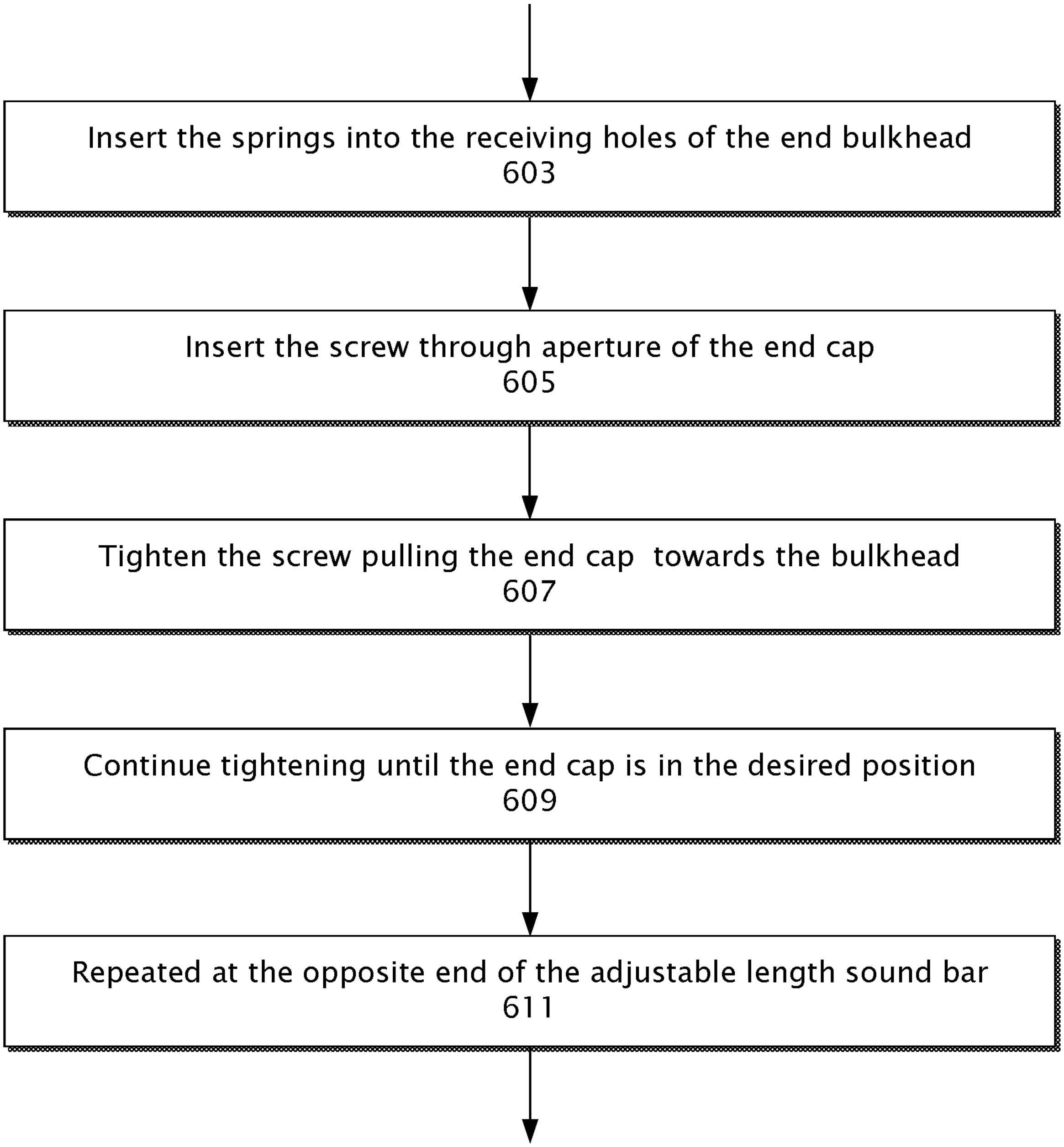
FIG. 6 shows a method of adjusting an endcap on the adjustable sound bar.

FIG. 6 shows a method 601 of adjusting an endcap on the adjustable sound bar (203 of FIG. 2). First at insert the springs (10 of FIG. 4) into the receiving holes (5 of FIG. 4) of the end bulkhead 603. At block 605 an exemplary flat headed M4×44 mm long screw (401 of FIG. 4) is inserted through aperture 315 of the endcap (207 of FIG. 4). At 607 the screw (401 of FIG. 4) is tightened pulling the endcap (207 of FIG. 4) towards the bulkhead (301 of FIG. 4), and compressing the springs (10 of FIG. 4). At 609 the adjustment continues until the endcap is in the desired position. At 611 the process is repeated for the opposite end of the adjustable length sound bar.

Those skilled in the art will realize that the process sequences described above may be equivalently performed in any order to achieve a desired result. Also, sub-processes may typically be omitted as desired without taking away from the overall functionality of the processes described above.

The invention claimed is:

1. An adjustable sound bar comprising:
- a rectangular sound bar case including at least one bulkhead end, the at least one bulkhead end including: a threaded hole, a first receiver hole, and a second receiver hole;
- at least one rectangular endcap sized to fit over the at least one bulkhead end of the rectangular sound bar case, with an aperture disposed in a surface of the at least one rectangular endcap at its center which is opposite an open end of the at least one rectangular endcap;
- a first spring disposed in the first receiver hole;
- a second spring disposed in the second receiver hole; and
- a threaded fastener wherein the threaded fastener is inserted through the aperture and engages the threaded hole, and wherein the at least one rectangular endcap contacts the first spring and the second spring as the threaded fastener is advanced into the threaded hole.

2. The adjustable sound bar of claim 1, in which the first spring and the second spring are coil springs.

3. The adjustable sound bar of claim 1, in which the threaded fastener is a flat headed screw.

4. The adjustable sound bar of claim 1, in which the aperture is centered between the first receiver hole and the second receiver hole.

5. The adjustable sound bar of claim 1, in which the rectangular sound bar case further comprises:
- a right channel speaker;
- a left channel speaker; and
- a center speaker in which the right speaker, the left speaker and the center speaker are disposed in a face of the rectangular sound bar case.

6. The adjustable sound bar of claim 1, in which the rectangular sound bar case further comprises a grille covering the right channel speaker, the left channel speaker and the center speaker.

7. The adjustable sound bar of claim 1, in which the rectangular sound bar case is aluminum.

8. A method of producing a sound bar of a width matching a television width comprising:

providing a sound bar of a fixed width;

adjusting a first endcap disposed at a first end of the sound bar, and a second endcap disposed at a second end of the sound bar to match the television width, in which adjusting is performed by compressing at least one spring disposed between an endcap and the sound bar of fixed width.

9. An adjustable sound bar comprising:

a sound bar case including at least one bulkhead end, the at least one bulkhead end including: a threaded hole, a first receiver hole, and a second receiver hole;

at least one endcap sized to fit over the at least one bulkhead end of the sound bar case, with an aperture disposed in a surface of the at least one endcap at its center which is on a surface opposite an open end of the at least one endcap;

a first spring disposed in the first receiver hole;

a second spring disposed in the second receiver hole; and a threaded fastener inserted through the aperture and engaging the threaded hole, and wherein the at least one endcap contacts the first spring and the second spring as the threaded fastener is advanced into the threaded hole.

10. The adjustable sound bar of claim 9, in which the sound bar case is aluminum.

11. The adjustable sound bar of claim 9, in which the sound bar case is rectangular.

12. The adjustable sound bar of claim 9, in which the sound bar case is cylindrical.

13. The adjustable sound bar of claim 9, in which the first spring and the second spring are coil springs.

14. The adjustable sound bar of claim 9, in which the threaded fastener is a flat headed screw.

15. The adjustable sound bar of claim 9, in which the aperture is centered between the first receiver hole and the second receiver hole.

16. The adjustable sound bar of claim 9, in which the sound bar case further comprises:

a right channel speaker;

a left channel speaker; and a center speaker in which the right speaker, the left speaker and the center speaker are disposed in a face of the sound bar case.

17. The adjustable sound bar of claim 9, in which the sound bar case further comprises a grille covering the right channel speaker, the left channel speaker and the center speaker.

18. The adjustable sound bar of claim 9, in which the case includes audio processing circuitry.

19. The adjustable sound bar of claim 9, further comprising a remote control wirelessly coupled to the adjustable sound bar to control the volume of the adjustable sound bar.

* * * * *